United States Patent [19]

Tada

[11] Patent Number: 4,746,993
[45] Date of Patent: May 24, 1988

[54] ELECTRONIC STILL CAMERA WITH INDICATOR FOR NUMBER OF TRACKS AVAILABLE FOR VIDEO AND/OR AUDIO RECORDING

[75] Inventor: Kanehiro Tada, Tokyo, Japan
[73] Assignee: Sony Corporation, Tokyo, Japan
[21] Appl. No.: 865,283
[22] Filed: May 21, 1986

[30] Foreign Application Priority Data

May 31, 1985 [JP] Japan ................................ 60-118180

[51] Int. Cl.⁴ ............................................ H04N 5/781
[52] U.S. Cl. .................................. 358/335; 358/906;
358/909; 369/53
[58] Field of Search ...................... 358/335, 906, 909;
369/53; 360/55, 137; 369/58

[56] References Cited

U.S. PATENT DOCUMENTS 3,705,699 12/1972 Siller .................................... 242/199

FOREIGN PATENT DOCUMENTS 57-14260 1/1982 Japan .................................... 358/909

Primary Examiner—Robert L. Richardson
Attorney, Agent, or Firm—Ronald P. Kananen

[57] ABSTRACT

A solid-state still camera includes a detector for detecting how much track space is already occupied and producing a detector signal for every occupied track. A counter counts the detector signals and produces a counter signal representative of the number of occupied tracks. The solid-state still camera is also provided with a manually operable mode selector for selecting video recording mode from among a plurality of different modes, such as frame mode and field mode. An arithmetic circuit is associated with the counter to receive the counter signals therefrom. The arithmetic circuit is also connected to the mode selector to receive a selected mode indicative signal. The arithmetic circuit derives the number of pictures that can be taken based on the counter signal value and the selected mode indicative signal. The value derived by the arithmetic circuit is displayed on a visual display. Preferably, the solid-state still camera also includes an audio recording feature. The detector also detects the tracks occupied by recording audio signals. The indicator makes it possible to conveniently know the number of blank tracks available for taking pictures or recording audio sounds.

23 Claims, 4 Drawing Sheets

12/25

12/25    12/25    12 TH / 25 TOTAL    LEFT 12 / TOTAL 25

12./25    12+/25

ELECTRONIC STILL CAMERA WITH INDICATOR FOR NUMBER OF TRACKS AVAILABLE FOR VIDEO AND/OR AUDIO RECORDING

BACKGROUND OF THE INVENTION

The present invention relates generally to a solid-state still camera for recording still video images and/or digital audio signals on a recording disk. More specifically, the invention relates to a solid state still camera with an indicator for the number of tracks remaining for video recording and audio recording. More specifically, the invention relates to a solid-state camera operable in at least a normal resolution mode and a high resolution mode, which camera includes an indicator for the number of remaining tracks on a recording medium disk for recording still image data and/or audio data.

In recent years, electronic or solid-state still camera have been developed which record still image data on a plurality of tracks on a magnetic disk. For example, such a solid-state still camera has been illustrated in the British Patent First Publication No. 2,112,603, published on July 20, 1983, and assigned to the common assignee to the present invention. The disclosed solid-state still camera is capable of picking up still image data in variable resolution modes. The particular still image recording mode providing normal video resolution will hereafter be referred to as "field mode" and the other recording mode providing higher resolution than the field mode will hereafter be referred to as "frame mode". In the field mode, one field image at normal resolution is recorded on one track on a magnetic disk. On the other hand, in the frame mode, one frame image of higher resolution is recorded on two tracks. The frame image may, for example, have twice the vertical resolution of the field mode.

The prior proposed solid-state still camera allows switching of the video recording mode between the field mode and the frame mode at any time.

Since the magnetic disk serving as a recording medium for the solid-state still camera has a fixed number of tracks, e.g. 50 tracks, the number of still images that can be taken will vary depending upon the selected recording mode. This makes it difficult for the user to count the number of used tracks and the number of tracks available for recording. In particular, when the magnetic disk is removed from the solid-state still camera before all the tracks have been exposed, the user may have trouble recalling the number of tracks already used and consequently may not know how many tracks are still available for video recording when the magnetic disk is re-inserted in the solid-state still camera.

In addition, a recently proposed solid-state still camera can also record audio signals. The solid-state still camera with audio recording ability has been disclosed in the co-pending U.S. patent application Ser. No. 800,330, filed on Nov. 21, 1985, assigned to the common assignee to the present invention. In the disclosed camera, audio data for a given period of time, e.g. 10 sec., can be recorded on one track of the magnetic disk. This means, when one track is used for audio recording, the number of tracks available for video and/or audio recording is reduced. This makes counting the number of tracks available for video and/or audio recording even more difficult.

SUMMARY OF THE INVENTION

Therefore, it is a principle object of the present invention to provide a solid-state still camera of the aforementioned type, with an indicator for the number of remaining blank tracks available for video and/or audio recording.

Another object of the invention is to provide a solid-state still camera with an indicator capable of indicating the number of pictures that can be taken in different resolution recording modes, e.g. the field mode and the frame mode.

In order to accomplish the aforementioned and other objects, a solid-state still camera, according to the present invention, includes a detector for detecting how much track space is already occupied and producing a detector signal for every occupied track. A counter counts the detector signals and produces a counter signal representative of the number of occupied tracks. The solid-state still camera is also provided with a manually operable mode selector for selecting video recording mode from among a plurality of different modes, such as frame mode and field mode. An arithmetic circuit is associated with the counter to receive the counter signals therefrom. The arithmetic circuit is also connected to the mode selector to receive a selected mode indicative signal. The arithmetic circuit derives the number of pictures that can be taken based on the counter signal value and the selected mode indicative signal. The value derived by the arithmetic circuit is displayed on a visual display.

In the preferred construction, the solid-state still camera also includes an audio recording feature. The detector also detects the tracks occupied by recorded audio signals.

The indicator makes it possible to conveniently know the number of blank tracks available for taking pictures or recording audio sounds.

According to one aspect of the invention, an electronic still camera comprises an image pick-up means for picking up video data, a data recording means, including a recording medium having a given number of recording areas, each adequate for storing one field of video data, for recording the video data picked up by the image pick-up means, a detector means for detecting the number of the recording areas already storing video data and producing a detector signal representative of the number of already recorded recording areas, and an indicator means for visually displaying data concerning the use and availability of space on the recording medium.

The indicator means displays the number of recording areas available for recording video data. In the alternative, the indicator means displays the number of recording areas already occupied and thus displays the number of recording areas available for recording. This will permits the user of the camera to known how many pictures can be taken with the disk set in the camera.

In the preferred arrangement, the image pick-up means and the data recording medium are operable in various resolution modes and are associated with a resolution mode selector means for switching among operating modes. The resolution mode selector means can select at least between a normal resolution mode and a higher resolution mode, in which normal resolution mode one recording area is occupied per one shot of video recording, and in which higher resolution mode more than one recording areas are occupied per one shot of video recording. In such preferred arrangement, the indicator includes a resolution mode indicator for indicating the selected mode. Also, in such preferred arrangement, the detector means is associated with the resolution mode selector means for deriving the number of already recorded recording areas based on number of shots already taken and the selected resolution mode at each shot.

The electronic still camera may also comprise an audio recording means for receiving audio data, which audio recording means is associated with the data recording means for recording audio data in the recording area of the recording medium, and the audio recording means allows a given period of audio recording per each audio recording operation. In order to perform video recording and audio recording selectively, the electronic still camera also comprises a mode selector means for selectively operating the image pick-up means and the audio recording means. In such case, the detector means is associated with the recording mode selector means for deriving the number of recording areas already recorded based on the selected one of video recording and audio recording mode.

Preferably, the audio recording means is associated with an audio recording time setting means for performing audio recording for said given period of time varies with the audio recording time set by means of said audio recording time setting means. The audio recording time setting means can be set to at least in a first time corresponding to one unit of time for recording a single recording area to said recording medium and a second time corresponding to more than one unit of time. The indicator includes a recording mode indicator for indicating selected one of image pick-up mode and audio recording mode. The indicator also includes a set time indicator for indicating the set audio recording time.

The recording mode selector switch can select both image pick-up mode and audio recording mode wherein first the image pick-up means performs video data recording and subsequently the audio recording means performs audio data recording. When the both recording modes are selected, the audio recording means is activated a predetermined delay time after the image pick-up means terminates the video data recording operation.

The indicator also includes an analog indicator consisting of a plurality of indicator segments adapted to be turned off and on one-by-one to indicate already recorded recording areas and empty recording areas, respectively.

The recording medium comprises a magnetic disk having a given number of recording tracks, each of which tracks serves as one of the recording areas.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiments, but are for explanation and understanding only.

In the drawings.

DESCRIPTION OF THE PREFERRED EMBODIMENTS

Figure 1:
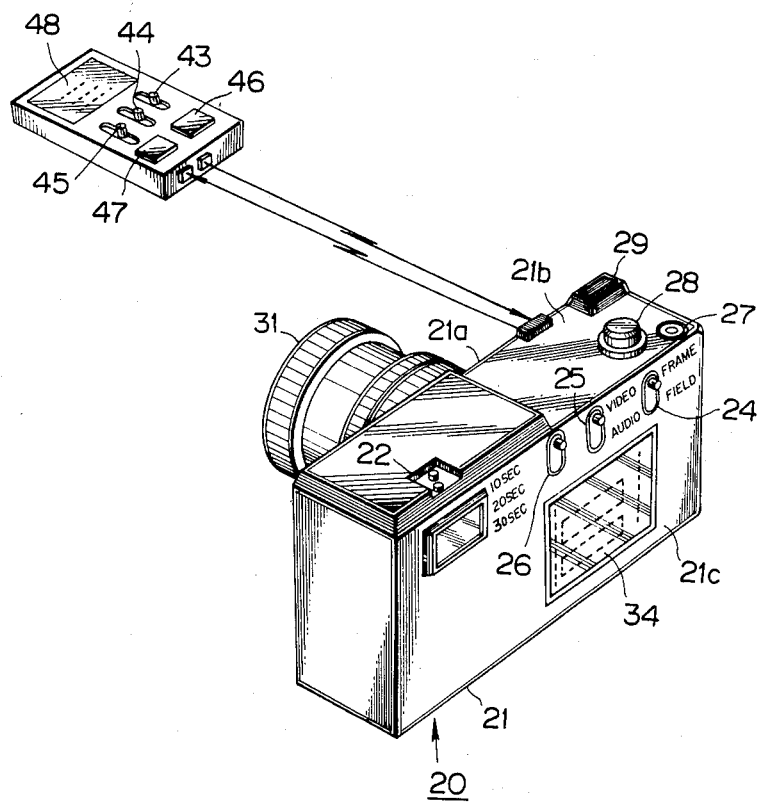
FIG. 1 is an illustration of the preferred embodiment of a solid-state still camera according to the present invention.

Referring now to the drawings, particularly to FIG. 1, the preferred embodiment of an electronic still camera 20 according to the present invention is designed to pick-up and record video images on a magnetic recording medium, such as a magnetic disk. The electronic still camera is also designed to record audio sounds for a given period of time. The magnetic disk serving as the magnetic recording medium can also record audio signals for reproduction.

The preferred embodiment of the electronic still camera has a camera body 21 of generally thin box-shaped configuration, such as is common in normal photofilm cameras. The camera body 21 consists a front wall 21a, a ceiling 21b and a back wall 21c. The ceiling 21 is formed with a recess 22 to be coupled with a flash apparatus (not shown). A viewfinder 23 is formed in the back wall 21c of the camera body 21. Since the preferred embodiment of the electronic still camera 20 allows video image recording in different resolution modes, specifically the field and frame modes, mentioned earlier, a mode selector switch 24 is provided near the upper edge of the back wall 21a. Also, a video/audio selection switch 25 and audio recording time setting switch 26 are provided on the back wall 21c.

For performing audio recording, a audio recording start button 27 is arranged on the ceiling 21b. Also, a release button 28 for operating a shutter mechanism 104 (shown in FIG. 2) is provided on the ceiling 21b. A microphone 29 for audio recording is also provided on the ceiling 21b.

A lens 31 projects from the front wall 21a of the camera body 20 for focusing images on a video image receptor, such as a charge-coupled device (CCD) 108 (shown in FIG. 2) through the shutter mechanism 104.

The preferred embodiment of the electronic still camera 20 also has an indicator 34 for indicating the number of pictures that can be taken and other necessary information.

The preferred embodiment of the electronic still camera 20 can be remotely controlled by means of a remote controller 40. The remote controller 40 has a remote control signal transmitter 41 for transmitting a remote control signal. The remote control signal employed in the preferred embodiment is an infrared beam of variable frequency depending upon the encoded command. However, any appropriate signal, such as ultra-sonics, radio or the like, can be used in place of the infrared beam. In order to receive the remote control signal from the remote controller 40, a remote control signal receiver 32 is provided in the camera body 20.

In order to enable frame/field mode selection, video/audio mode selection and audio recording time setting through the remote controller, switches 43, 44 and 45 are provided on the remote controller. In addition, the remote controller 40 is provided with a release button 46 and an audio recording start button 47, which operates in substantially the same manner as the release button 28 and the audio recording start button 27 on the camera body 20.

The remote controller 40 also has an indicator 48 for indicating the number of pictures that can be taken and other necessary information. For displaying the information on the indicator 48 of the remote controller 40, a data signal, such as an infrared beam, is transmitted from a data signal transmitter 33 built into the camera body 21. The remote controller 40 has a data signal receiver 49 for receiving the data signal.

The data signal from the data signal transmitter 33 contains data indicative of the information displayed on the indicator 34 in the camera body 21. Therefore, the information displayed on the indicator 48 of the remote controller 40 will be consistent with that displayed on the indicator 34.

Figure 2:
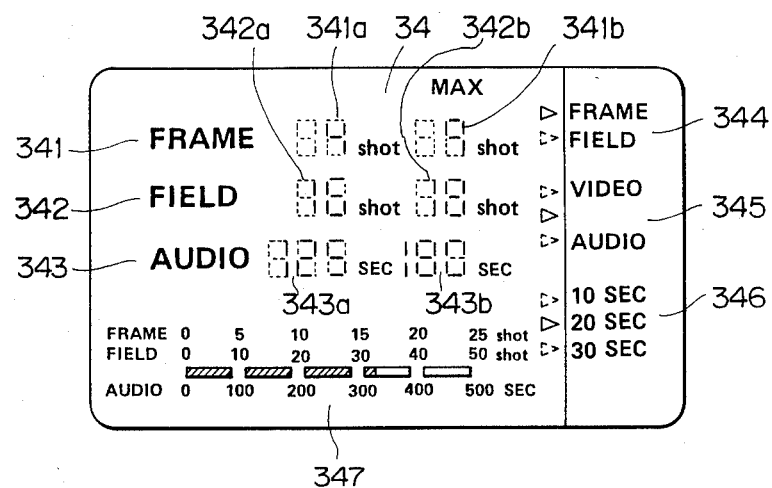
FIG. 2 is an enlarged illustration of the indicator in the solid-state still camera of FIG. 1.

FIG. 2 shows the preferred form of display on the indicator 34. In the preferred format, the indicator 34 includes a row 341 displaying information for frame mode. The row 341 includes a column 341a showing the number of shots already taken in frame mode and a column 341b showing the number of remaining shots that can be taken in frame mode. The indicator 34 also has a row 342 for field mode. The row 342 includes a column 342a showing the number of shots already taken in field mode and a column 342b showing the number of shots that can be taken in the field mode. The indicator 34 also has a row 343 for displaying information concerning audio recording. The row 343 includes a column 343a showing the recording time already used and a column 343b showing the recording time still available for recording audio signals.

The indicator 34 also includes a frame/field mode indicator 344, a video/audio mode indicator 345 and a recording time indicator 346. Also, the indicator 34 may includes an analog indicator 347 showing the total occupied area and empty area of the recording medium.

It should be noted that the shown embodiment of the electronic still camera is operative in video recording mode, audio recording mode and video and audio recording mode. Therefore, the video/audio mode indicator 345 can take three positions respectively representative of the corresponding mode. For instance, as shown in FIG. 2, when the indicator segment of the video/audio mode indicator 345 is positioned between the video mode indication and the audio mode indication, it represents both of video and audio recording modes.

Figure 3:
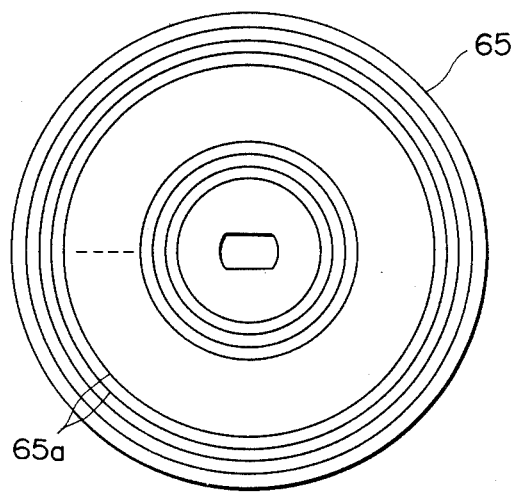
FIG. 3 is a plan view of a magnetic disk to be used as a video and/or audio recording medium in the preferred embodiment of the solid-state still camera according to the invention.

In practice, the preferred embodiment of the electronic still camera employs the magnetic disk 65 as shown in FIG. 3. The magnetic disk 65 has a recording area on which 50 tracks can be formed. Each track on the magnetic disk is adapted to retain one field of video signal data and 10 sec. of audio data. Each track can be used either for video recording or audio recording. The recording tracks are formed during recording of video or audio signal on the magnetic disk 65. As is well known, the recording tracks formed on the magnetic disk 65 are respectively identified by address numbers 1–50 assigned thereto.

On the other hand, as mentioned previously, a single recording track is used to video record a still image in the field mode and two recording tracks are occupied by a single still image in the frame mode. Therefore, the number in the column 341a indicative of the number of frame mode shots taken is actually only half of the number of tracks occupied by frame mode shots. For instance, in the example of FIG. 2, 18 tracks are occupied by the 9 shots taken in frame mode. Similarly, the number in column 342a represents the exact number of tracks used to take still images in field mode. For instance, in the shown example, in order to take 16 shots, 16 tracks are used. Finally, the column 343a represents recording time already recorded. In the shown embodiment, one track is used to record up to 10 sec of audio. If a single audio recording lasts longer than 10 sec., then more than one track is used for that single audio recording. For instance, when the audio recording time is set to 20 sec., two tracks will be used for each audio recording.

Columns 341b and 342b respectively represent the maximum number of shots that can be taken with the remaining track areas in the corresponding recording mode. The column 343b likewise represents the maximum recording time for audio signals with the remaining track area.

The analog indicator 347 aids quick recognition of the number of occupied tracks and available tracks.

It should be appreciated that, although the shown embodiment has an indicator 34 with rows 341 and 342 respectively indicating the occupied tracks and available tracks in the frame and field modes, it would be possible to use a single row to selectively indicate the number of occupied tracks and available tracks in either frame mode or field mode. In this case, the indication will be switched according to which video recording mode is currently activated via the frame/field mode selector 24 or 43. Furthermore, if an also simplified display on the indicator 34 is required, the indication of the occupied tracks and available tracks for video recording and audio recording can be given on a single display. Finally, it would still be satisfactory to display only the analog indicator 347 in order to show the total number of occupied tracks and available tracks.

Figure 4:
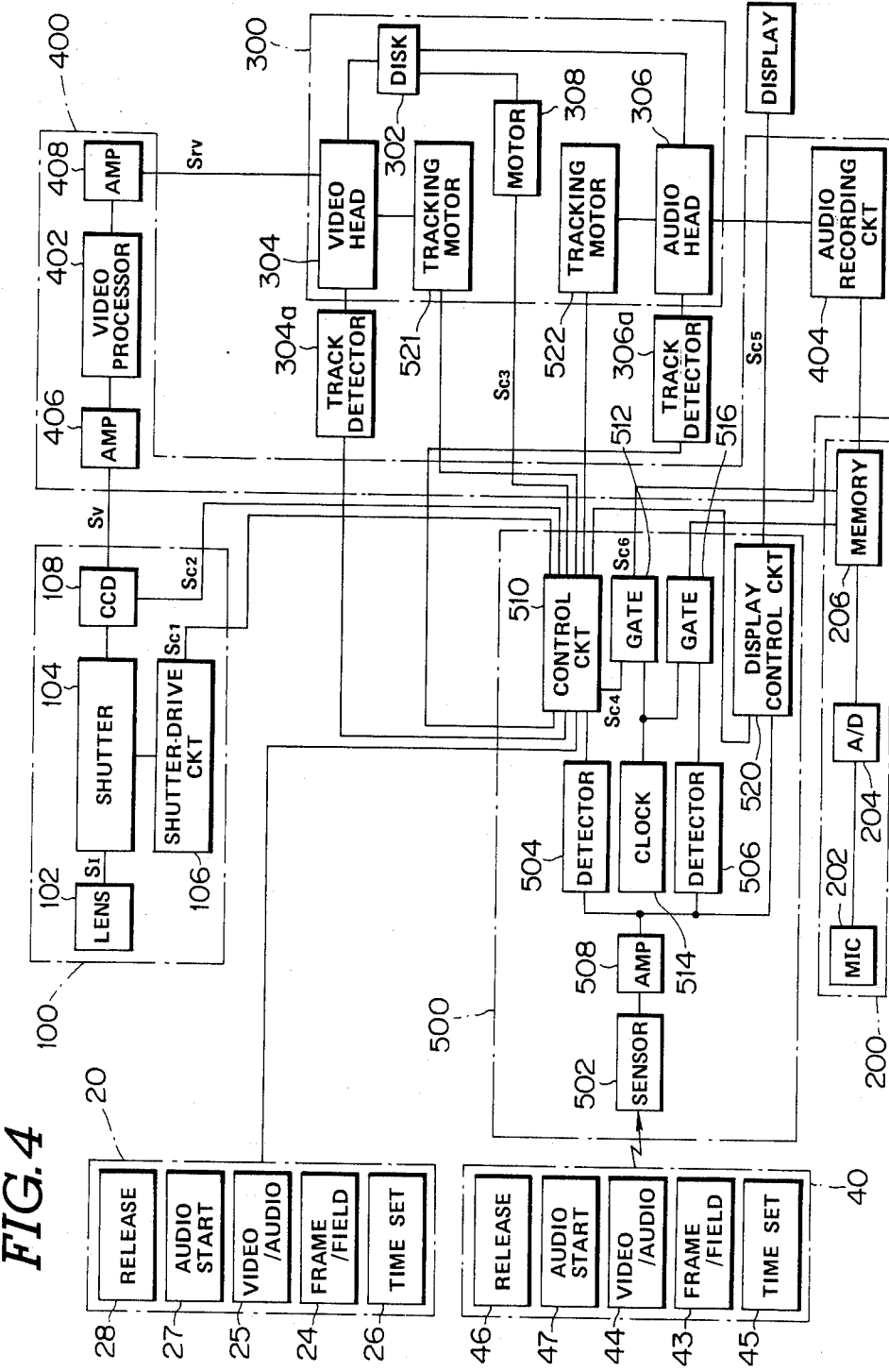
FIG. 4 is a block diagram showing an indicator control circuit in the camera circuit of FIG. 3 in detail.

FIG. 4 shows the circuitry of the preferred embodiment of the electronic still camera according to the present invention. In general, the preferred embodiment of the electronic still camera 20 has an image pick-up system 100 and an audio receiver system 200, as set forth above. The image pick-up system 100 includes a lens assembly 102 which focuses an image on an image receptor comprising a charge transfer device, such as a charge-coupled device (CCD) 108, through a shutter mechanism 104. The shutter mechanism 104 controls exposure of the CCD 108 and therefore, its opening and closure is controlled by a shutter drive circuit. On the other hand, the audio receiving system 200 includes a microphone 202 and a memory 206. The memory 206 comprises a digital memory for receiving pulse-code-modulated (PCM) audio signals. In order to derive PCM signals from the output of the microphone 202, an analog-to-digital (A/D) converter 204 is interposed between the microphone and the memory.

The camera 20 also has a disk drive unit 300 with the magnetic disk 65 serving as a video and audio recording medium. The image received by the CCD 108 and the PCM audio signals stored in the memory 206 are transferred to and stored on the magnetic disk 65 by means of a video head 304 and an audio head 306 respectively.

It should be appreciated that although the shown embodiment employs a video head and an audio head for independent recording and reproducing operations, a common magnetic head can be utilized for both video and audio recording and reproduction. Therefore, the present invention should not be limited to electronic still camera systems which have separately operable video and audio heads.

A recording controller 400 controls transfer of the image data from CCD 108 and PCM signals from the memory 206. The recording controller 400 generally comprises a video processor 402 and an audio recording circuit 404. The video processor 402 is connected for input from CCD 108 via an amplifier 406 and is connected for output to the video head 304 via another amplifier 408. On the other hand, the audio recording circuit 404 is designed to receive the PCM audio signals from the memory 206 and pass the PCM audio signals to the audio head 306 for recording.

It should be noted that a system for picking up an image and recording video data for the picked-up image on the magnetic disk, similar to the shown embodiment, has been disclosed in the British Patent First Publication No. 2,112,603A, published on July 20, 1983. The contents of this British Patent First Publication are hereby incorporated by reference for the sake of disclosure.

The camera 10 also has a system controller 500 for controlling operation of the image pick-up system 100, the audio receiving system 200, and the disk drive unit 300. The system controller 500 has a control circuit 510. The control circuit 510 is activated by manual depression of the release button 28. The control circuit 510 when activated controls the shutter drive circuit 106 which controls exposure timing and duration. Also, the control circuit 510 controls the read-out timing of the video data from CCD 108 and the operation of a disk drive motor 308 in the disk drive unit 300. The system controler 500 includes a remote control signal receiver 32 which is mounted on the camera body 20 and receives remote control signals from a remote controller 600.

The system controller 500 has a detector 504 connected for input from the remote control signal receiver 32 via an amplifier 508. The detector 504 responds to the output of the remote control sensor 502 indicative of the video recording demand which is generated by the remote controller 40 in response to depression of the release button 46, by outputting a detector signal to the control circuit 510. The control circuit 510 is activated by the detector signal and thereafter picks up images just as it does in response to manual depression of the release button 28.

Hereafter, the control signal output from the control circuit 510 for controlling the shutter drive circuit 106 will be referred to as "shutter control signal $Sc_1$", that for controlling read-out timing of video data from the CCD will be referred to as "video data read-out control signal $Sc_2$", that for controlling the disk drive motor will be referred to as "disk drive control signal $Sc_3$", and that for controlling read-out timing of the PCM signals from memory 206 will be referred to as "PCM signal read-out control signal $Sc_4$".

Furthermore, the control circuit 510 also controls the CCD 108 and the video processor 402 for selectively performing video recording in the frame mode and the field mode. For controlling the operation modes between the frame mode and the field mode, the control circuit 510 outputs a frame/field mode selection signal $Sc_5$ to the CCD 108 and the video processor 402. The control circuit 510 also controls the audio recording time depending upon the set recording time. Therefore, the control circuit 510 produces an audio recording time control signal $Sc_6$ for controlling the audio recording time.

The system control 500 also includes a detector 506. The detector 506 responds to a sensor output indicative of an audio recording demand by outputting a detector signal to a gate 512. The gate 512 is connected to a clock generator 514 in order to receive a clock signal $S_t$. The gate 512 responds to the detector signal 506 by sending a write-enable signal $Sc_7$ to the memory 206 in order to allow storage of audio data in the form of PCM signals for a predetermined period of time, e.g. 10 sec. The clock generator 514 also sends the clock signal to another gate 516. The gate 516 is connected to the control circuit 510 to receive the PCM signal read-out control signal $Sc_4$, whereupon it sends a read-enable signal $Sc_8$ to the memory 206. In response to this read-enable signal $Sc_8$, the stored audio data is transmitted to the audio recording circuit 404.

The aforementioned audio recording time control signal $Sc_6$ may be generated by the control circuit 510 at the end of the set recording time and fed to the gate 512. The gate 512 is responsive to the audio recording time control signal to terminate the write-enable signal $Sc_7$ and so disable storage of the audio data.

The control circuit 510 also controls addressing of the video head 304 and the audio head 306. Therefore, the control circuit 510 produces a tracking signal $Sc_9$ for a tracking motor 67 which controls the head positions over the magnetic disk 65.

The system controller 500 also controls display 34. Therefore, the system controller 500 is provided with a display control circuit 520. The display control circuit 520 is connected to the video/audio mode selector switch 25, the frame/field mode selector switch 24 and the audio recording time set switch 26. Similarly, the display control circuit 520 is connected to the detectors 504 and 506 for receiving the video/audio mode selection data, frame/field mode selection data and audio recording time data.

The circuitry of the preferred embodiment of the electronic still camera also includes a track detector 304a and 306a respectively associated with the video head 304 and the audio head 306. In practice, the track detectors 304a and 306a monitors FM signals in the playback output of the corresponding one of the video head 304 and the audio head 306 and produces detector signals. The detector signal is in the form of a single pulse indicative of a single track already encoded with video or audio data.

Figures 5, 6, 7, 8, 9, 10, 11, 12:
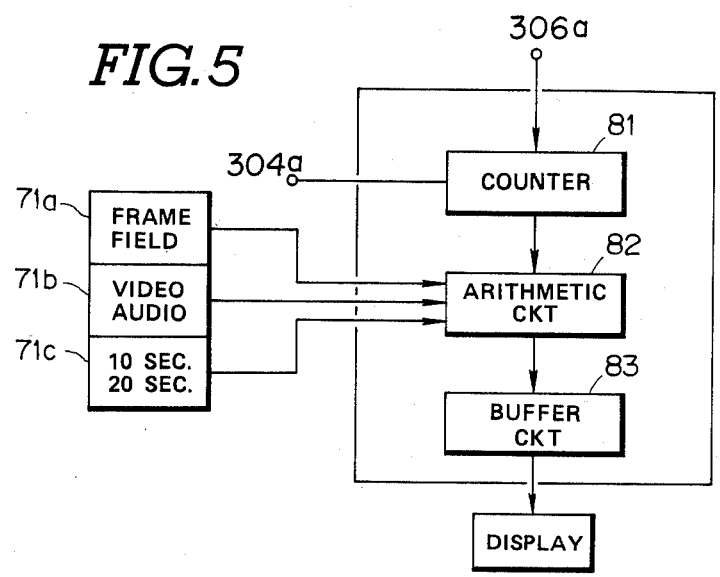
FIG. 5 is a block diagram of the preferred embodiment of the solid-state still camera circuit according to the present invention.
FIGS. 6 to 12 illustrate variations of the display on the indicator.

As shown in FIG. 5, the display control circuit 520 comprises counters 521 and 522 respectively connected to the corresponding track detectors 304a and 306a to receive therefrom the detector signals, an arithmetic circuit 523 and a buffer circuit 524. The counters 521 and 522 respectively count occurrences of the detector signals from the track detectors 304a and 306a and output counter signals having values indicative of the counter values. The arithmetic circuit 523 receives the counter signals from the counters 521 and 522 and derives the total number of occupied tracks on the magnetic disk 65. The arithmetic circuit 523 also receives the video/audio mode selection data representative of the selected video or audio recording mode depending on the switch position of the video/audio mode selector switch 25 or 44, the frame/field mode selection data representative of the selected frame or field mode in video recording depending upon the switch position of the frame/field mode selector switch 24 or 43, and the audio recording set time data representative of the audio recording time selected by means of the recording time set switch 26 or 45.

The arithmetic circuit 523 sends the video/audio mode selection data, the frame/field mode selection data and the audio recording set time data to the buffer circuit 524 for display of the selected recording modes in the columns 345, 344 and 346 of the indicator.

Also, the arithmetic circuit 523 derives the number of tracks used in each of the recording modes, i.e. frame mode video recording, field mode video recording and audio recording, based on the counter values from the counters 521 and 522 and mode selection data, i.e. video/audio mode selection data, the frame/field mode selection data and the audio recording set time data. The arithmetic circuit feeds data indicative of the number of tracks used in each mode of recording operation to the buffer circuit 524. The used track numbers are displayed in the rows allotted to video or audio recording. When deriving the number of available tracks, the arithmetic circuit 523 separately derives the number of tracks available for frame mode video recording, field mode video recording and audio recording. The derived numbers of available tracks in each mode are fed to the buffer circuit 524 for display in the columns 341b, 342b and 343b of the rows 341, 342 and 343 of the indicator 34.

General operation of video recording process has been disclosed in the aforementioned British Patent First Publication No. 2,112,603. The contents of the British Patent First Publication are hereby incorporated by reference. On the other hand, two-way mode operation for video recording and audio recording has been disclosed in the co-pending U.S. patent application Ser. No. 800,330, field on Nov. 21, 1985, and assigned to the common assignee to the present invention. The contents of the co-pending U.S. patent application are similarly hereby incorporated by reference for the sake of disclosure.

In the various video recording resolution modes, the CCD 108 serving as the image pick-up means and the tracking motor 67 are controlled according to the mode of video recording. In the practical embodiment, scanning intensity on the CCD 108 is adjusted according to the selected frame or field mode. For instance, in the field mode, the scanning intensity horizontally will be twice that in the frame mode. Thus, twice as much image data will be obtained in the field mode than in the frame mode. The image data obtained in the field mode video recording is stored on two tracks on the disk.

On the other hand, in the audio recording, number of tracks to be used varies with the set recording time. Each track on the disk 65 is designed to hold compressed PCM audio signals corresponding to 10 sec. of recording time. Therefore, when 10 sec. of recording time is set, a single track is used. On the other hand, when 20 sec. or 30 sec. recording time is set, two or three tracks are used for audio recording.

When a brand new magnetic disk 65 is inserted in the preferred embodiment of the electronic camera 20, no tracks will be detected by the track detectors 304a and 306a. Therefore, the counter values of the counters 521 and 522 will remain zero. Under these conditions, the display in the columns 341a, 342a and 343a of the rows 341, 342 and 343 will remain zero, and the columns 341b, 342b and 343b will display their respective maximum values, i.e. "25 shots", "50 shots" and "500 sec.".

Assume that the video recording mode is selected through the video/audio recording mode selector switch 25, the frame mode is selected through the frame/field mode selector switch 24. The arithmetic circuit 523 receives the mode selection data. By depressing the release button 28 or 46, a single video image is taken in frame mode. The track detector 304a associated with the video head 304 detects that two tracks are now occupied. Thus, the counter value of the counter 521 becomes "1". Accordingly, the display in column 341a becomes "1". Since no field mode video recording or audio mode recording has taken place, the columns 342a and 343a remain "0". At this time, the maximum number of tracks that are free for use is reduced to "48". Therefore, the displays in the columns 341b, 342b and 343b become "24", "48" and "480".

If another picture is taken in video recording mode and in field mode, another single track is occupied. The newly filled track is detected by the active track detector 304a. Therefore, the counter value in the counter 521 is incremented by "1". This results in a display of "1" in the column 342a. Then space for 47 tracks remains on the disk. Therefore, the displays in the columns 341b, 342b and 343b will read "23", "47" and "470".

It should be appreciated that, since the frame mode video recording requires two tracks per shot, the number of shots that can be taken in the remaining track space will be 23. If all of the remaining shots are taken in frame mode, one track will remain.

When the audio mode is selected under these conditions and 30 sec. recording is set, three tracks are required for each audio recording episode. Audio recording for 30 sec. is performed upon depressing the audio recording start button 27 or 47. Then, three encoded tracks are newly formed on the disc 65. These tracks are detected by the detector 306a associated with the audio head 306. Therefore, the counter value of the counter 522 becomes "3". At this time, the display in the columns 341a, 342a and 343a will be "1", "1" and "30". This means that 2 tracks are occupied by a picture taken in frame mode, 1 track is occupied by a picture taken in field mode, and 3 tracks are occupied by audio recording. Therefore, the remaining track space on the disk 65 is "44". The displays in the columns 341b, 342b and 343b thus change to "22", "44" and "440".

In the above process, the arithmetic circuit 523 also derives the total number of tracks already occupied based on the counter values of the counters 521 and 522 and turns off a number of indicator segments in the analog indicator 347 corresponding to the number of occupied tracks. Therefore, the analog indicator 347 represents the remaining track area in an analog manner.

On the other hand, when a magnetic disk 54 which has already been used for video and/or audio recording but still retains some track area for recording is inserted in the camera 20, one of the video or audio head 304 or 306 radially scans the disk and reproduces FM signals for each pre-recorded track. One of the track detectors 304a and 306a corresponding to the active head 304 or 306 detects the leading edge of the FM signals and produces a detector signal at each occurrence of the FM signal. One of the counters 521 or 522 corresponding to the active detector 304a or 306a counts the detector signals.

The arithmetic circuit 523 thus derives the numbers of already occupied tracks and so of the available tracks. In this case, the arithmetic circuit 523 derives the display values for each of the columns 341a, 342a and 343a by converting the total number of already recorded tracks into shots or audio recording time in each mode. For example, assuming 13 tracks are already occupied, the displayed value in the respective columns 341a, 342a and 343a will be "7", "13" and "130". Alternatively, the arithmetic circuit 523 may not derive the display values for the columns 341a, 342a and 343a, but rather leave those columns blank and only derive the display data for the analog indicator 347. The display values for the columns 341b, 342b and 343b are derived by the arithmetic circuit 523 in essentially the same manner as set forth above.

It should be appreciated that although the present invention has been disclosed in detail in terms of the preferred embodiment having a specific display arrangement, it would be possible to modify the display arrangement in various ways. For example, the columns 341a, 342a and 343a for the numbers of tracks used in each mode of operation are not always necessary. Therefore, those columns can be left out of the display.

In an alternative embodiment, the display for indicating the numbers of occupied tracks and of remaining available tracks can be a single column, when a simplified display is desired. FIGS. 6 to 12 are examples of this modified display on the indicator 34. The shown modifications are designed to give the number of already recorded tracks in terms of the number of shots already taken and the maximum number of shots that may yet be taken, or the number of tracks remaining in terms of the number of remaining shots the number of shots possible on a blank disk. The examples of the display are all given in terms of frame mode video recording. The display values may change depending upon the selected video/audio mode, frame/field mode, etc.

In the examples of FIGS. 6, 7, 8 and 10, the number "12" represents the number of shots that may be taken in frame mode with the remaining tracks and the number "25" is the maximum number of shots that can taken in frame mode with a blank disk. On the other hand, in the example of FIG. 9, the first number "12" represents the number of shots already taken. Specifically, the shown example means that the next shot will be the 12th shot recorded on the current disk 65.

The examples of FIGS. 11 and 12 use the labels "12." and "12+" which respectively mean that 12 shots may still be taken in frame mode but after taking 12 shots, the disk will still have one track available for one shot in field mode or 10 seconds of audio recording. Such labels as are used in FIGS. 11 and 12 may be convenient when various modes of video and audio recording may be performed on a single disk.

According to the present invention, an indicator for an electronic still camera is provided. Since the electronic camera is operable in various modes which use different numbers of tracks for recording, the indicator constructed as set forth above will effectively convey necessary information to the user.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. An electronic still camera comprising:
   an image pick-up means for picking up video data;
   a data recording means, including a recording medium having a given number of recording areas, each adequate for storing one field of video data, for recording said video data picked up by said image pick-up means;
   a detector means for detecting the number of said recording areas already storing video data and producing a detector signal representative of the number of already recorded recording areas; and
   an indicator means for visually displaying data concerning the use and availability of space on said recording medium.

2. An electronic still camera as set forth in claim 1, wherein said indicator means displays the number of recording areas available for recording video data.

3. An electronic still camera as set forth in claim 1, wherein said indicator means displays the number of recording areas already occupied and thus displays the number of recording areas available for recording.

4. An electronic still camera as set forth in claim 1, wherein said image pick-up means and said data recording medium are operable in various resolution modes and are associated with a resolution mode selector means for switching among operating modes.

5. An electronic still camera as set forth in claim 4, wherein said resolution mode selector means can select at least between a normal resolution mode and a higher resolution mode, in which normal resolution mode one recording area is occupied per one shot of video recording, and in which higher resolution mode more than one recording areas are occupied per one shot of video recording.

6. An electronic still camera as set forth in claim 5, wherein said indicator includes a resolution mode indicator for indicating the selected mode.

7. An electronic still camera as set forth in claim 6, wherein said detector means is associated with said resolution mode selector means for deriving said number of already recorded recording areas based on number of shots already taken and the selected resolution mode at each shot.

8. An electronic still camera as set forth in claim 1, which also comprises an audio recording means for receiving audio data, which audio recording means is associated with said data recording means for recording audio data in said recording area of said recording medium, and said audio recording means allows a given period of audio recording per each audio recording operation.

9. An electronic still camera as set forth in claim 8, which also comprises a mode selector means for selectively operating said image pick-up means and said audio recording means.

10. An electronic still camera as set forth in claim 9, wherein said detector means is associated with said recording mode selector means for deriving said number of recording areas already recorded based on the selected one of video recording and audio recording mode.

11. An electronic still camera as set forth in claim 10, wherein said audio recording means is associated with an audio recording time setting means for performing audio recording for said given period of time varies with the audio recording time set by means of said audio recording time setting means.

12. An electronic still camera as set forth in claim 11, wherein said audio recording time setting means can be set to at least in a first time corresponding to one unit of time for recording a single recording area of said recording medium and a second time corresponding to more than one unit of time.

13. An electronic still camera as set forth in claim 12, wherein said image pick-up means and said data recording medium are operable in various resolution modes and are associated with a resolution mode selector means for switching among operating modes.

14. An electronic still camera as set forth in claim 13, wherein said resolution mode selector means can select at least between a normal resolution mode and a higher resolution mode, in which normal resolution mode one recording area is occupied per one shot of video recording, and in which higher resolution mode more than one recording areas are occupied per one shot of video recording.

15. An electronic still camera as set forth in claim 14, wherein said indicator includes a resolution mode indicator for indicating the selected mode.

16. An electronic still camera as set forth in claim 15, wherein said indicator includes a recording mode indicator for indicating selected one of image pick-up mode and audio recording mode.

17. An electronic still camera as set forth in claim 16, wherein said indicator also includes a set time indicator for indicating the set audio recording time.

18. An electronic still camera as set forth in claim 17, wherein said recording mode selector switch can select both image pick-up mode and audio recording mode wherein first said image pick-up means performs video data recording and subsequently said audio recording means performs audio data recording.

19. An electronic still camera as set forth in claim 18, wherein when said both recording modes are selected, said audio recording means is activated a predetermined delay time after said image pick-up means terminates the video data recording operation.

20. An electronic still camera as set forth in claim 17, wherein said indicator also includes an analog indicator consisting of a plurality of indicator segments adapted to be turned off and on one-by-one to indicate already recorded recording areas and empty recording areas, respectively.

21. An electronic still camera as set forth in claim 20, wherein said recording medium comprises a magnetic disk having a given number of recording tracks, each of which tracks serves as one of the said recording areas.

22. An electronic still camera as set forth in claim 21, which is associated with a remote controller for controlling operation of said electronic still camera.

23. An electronic still camera as set forth in claim 22, wherein said remote controller has a display displaying said availability data displayed on said indicator of said electronic still camera.

* * * * *